Aug. 14, 1934. P. L. TENNEY ET AL. Re. 19,275

TRANSMISSION CONTROL

Original Filed May 31, 1929 2 Sheets-Sheet 1

Inventors

Percy L. Tenney &

Harry E. Gridley

By

Blackmore, Spencer & Flint

Attorneys

Aug. 14, 1934. P. L. TENNEY ET AL Re. 19,275
TRANSMISSION CONTROL
Original Filed May 31, 1929 2 Sheets-Sheet 2
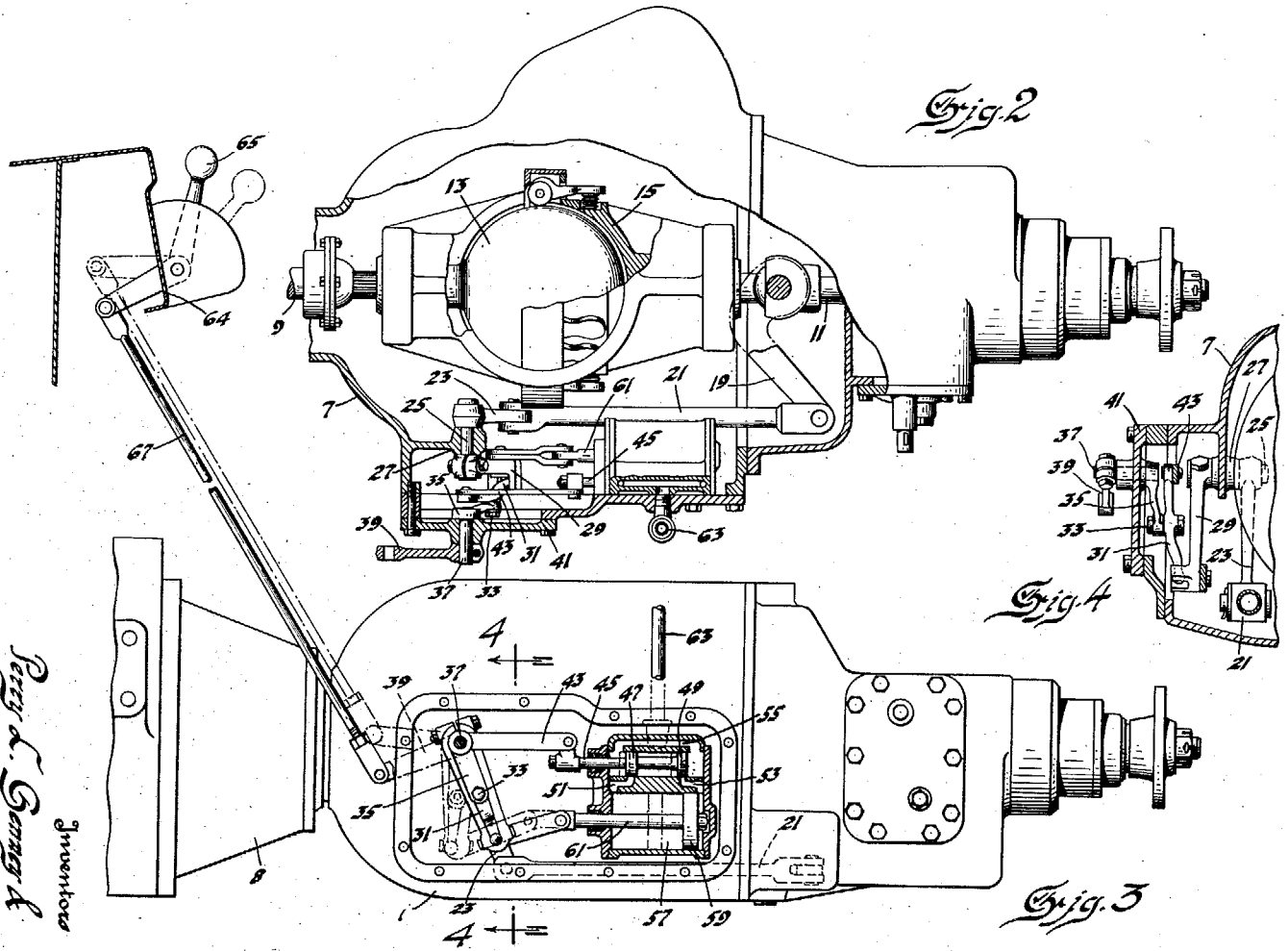
Inventors
Percy L. Tenney &
Harry E. Fiddler
By
Blackmore, Spencer & Flight
Attorneys Reissued Aug. 14, 1934 Re. 19,275

UNITED STATES PATENT OFFICE 19,275

TRANSMISSION CONTROL

Perry L. Tenney, Lansing, and Harry E. Fidler, Detroit, Mich., assignors to General Motors Corporation, Detroit, Mich., a corporation of Delaware Original No. 1,783,931, dated December 2, 1930, Serial No. 367,243, May 31, 1929. Application for reissue December 2, 1932, Serial No. 645,440

44 Claims. (Cl. 74—336.5)

This invention relates to power transmission mechanism, and more particularly to an operating means for changing the speed ratio between the driving and driven shafts.

An object of the invention is to utilize a fluid medium under pressure to make the changes in the transmission, said fluid medium being either directly or indirectly under manual control. Another object of the invention is to provide an automatically operating mechanism, itself subject to manual control, to operate the change speed mechanism in accordance with the engine speed and with driving effort or motor torque. Another object is to arrange for having the driving ratio between the driving and driven shafts change automatically, the changes being made by variations in engine speed and by changing pressure conditions in the engine manifold or by movements of the throttle valve. Other objects and advantages will be understood from the following description and the accompanying drawings.

In the drawings, Figure 1 is a view in side elevation of an engine of a motor vehicle with the clutch housing and transmission housing associated therewith, the transmission control device being shown in longitudinal section.

Figure 2 is a top plan view, partly broken away, of the change speed mechanism, the fluid pressure operating means being shown in section, this being an embodiment of the invention designed for direct manual control.

Figure 3 is a side elevation of the embodiment of the invention shown in Figure 2, the cover plate for the fluid pressure operating means being removed and parts being shown in section.

Figure 4 is a section on line 4—4 of Figure 3.

Figures 1, 5:
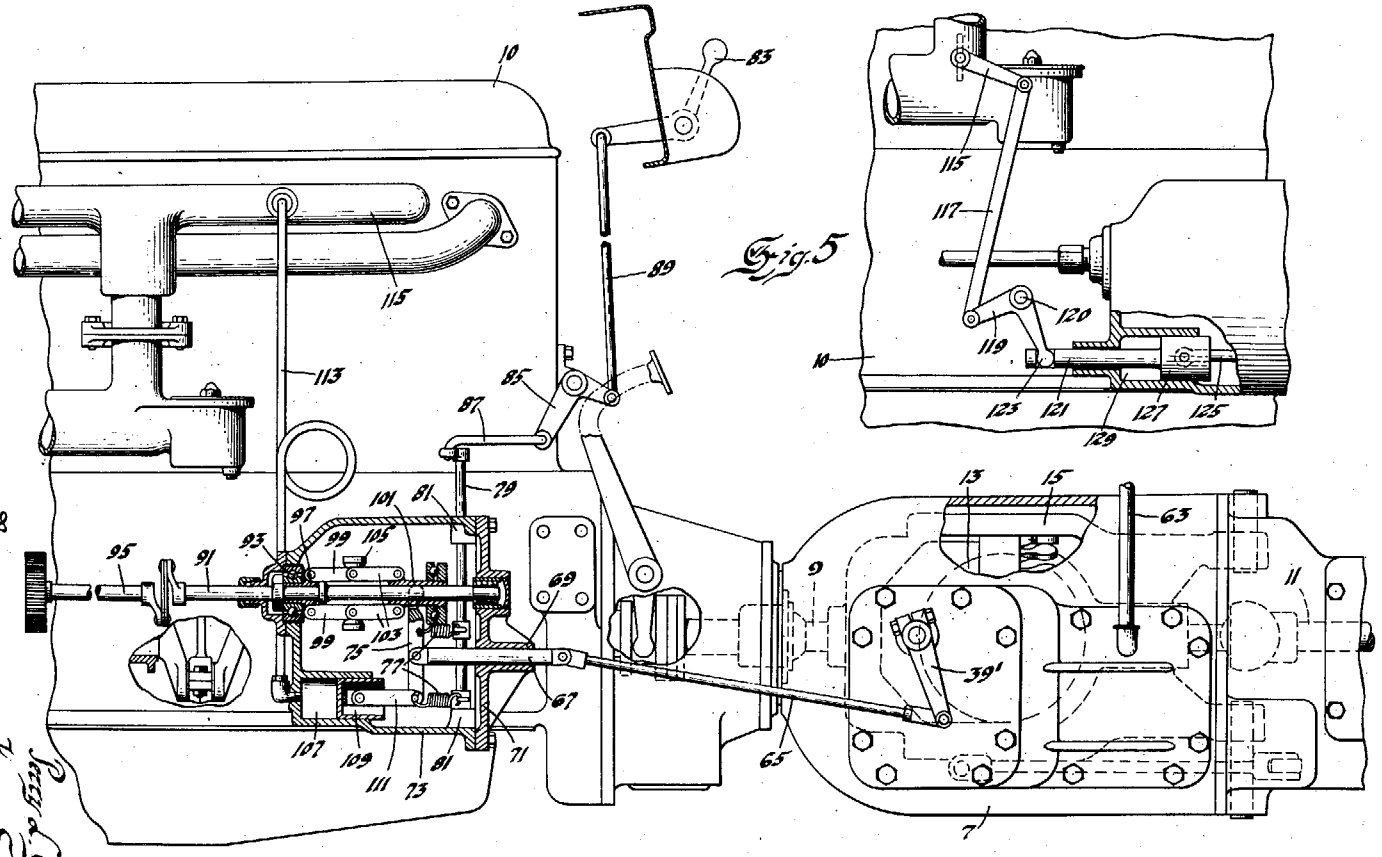
Figure 5 is a view in side elevation of a modification of the structure shown in Figure 1.

Referring first to Figures 2—3—4, numeral 7 represents a transmission housing associated with the clutch housing 8, located, as usual, at the rear of the engine 10, the latter not shown in Figure 2, but represented in Figure 1. The transmission mechanism within housing 7, is designed to afford variable speeds between the driving shaft 9, and the driven shaft 11. The transmission is not per se a part of this invention. It comprises a ball member 13, carried by driving shaft 9, and a yoke 15, having a circular series of rollers, gripping the ball. A lever 19 is movably mounted to effect a predetermined angular relation between shafts 9 and 11, whereby a reduction in driving ratio is effected to an extent proportional to the said angularity. When the shafts 9 and 11 are in alignment, the drive is in direct, or high, speed. Low speed is effected by the maximum angularity between said shafts.

This invention is primarily concerned with the mechanism for rotating lever 19 to change the angularity between shafts 19 and 11. As shown in Figure 2, lever 19 is connected by rod 21 with lever arm 23 on shaft 25, these parts being better shown in Figure 4. Shaft 25 is journalled at 27 in the casing. Shaft 25 has a second arm 29. To the end of arm 29 is connected the end of a floating lever 31. Intermediate its length, lever 31 is pivotally connected at 33 to the end of a lever arm 35, on a shaft 37. Shaft 37 has an operating arm 39, preferably outside the casing cover 41. The upper end of lever 31 is connected by a link 43 to a valve stem 45. Valve stem 45 carries valves 47 and 49, controlling passages 51 and 53, respectively, said passages 51 and 53 affording communication from a passage 55 to the cylinder 57 on one side or the other of the piston 59, which is movable in cylinder 57. A pipe 63 leads to passage 55 from any suitable source of fluid supply, such as a pump or reservoir, not shown. Piston 59 is connected by its rod 61 to the lower end of lever 31 and arm 29. In Figure 3 we have shown in section the instrument board 64 on which is mounted a lever 65. From the lever 65 extends a link 67, the link being connected at its lower end to the end of arm 39. When the parts are positioned as shown in full lines in Figure 3, the driving and driven shafts of the transmission are assumed to be in alignment. The valves are closed. If the lever 65 is moved toward the dotted line position, arm 39 swings clockwise, as also does arm 35. The resistance offered by the transmission elements and by the piston 59 in the cylinder 57, renders the lower end of floating lever 31 relatively immovable, as compared with the upper end. The lever 31 therefore swings counterclockwise about its lower end and pulls upon rod 43, and opens valve 49. This opens up a passage for a flow of fluid from passage 55 through 53 into the right hand end of cylinder 57. The piston 59 is therefore moved to the right. Since its rod is connected to the lower end of lever 31, to which lever arm 29 is also connected, this movement of the piston operates through arm 23 and rod 21 to swing lever 19 and change the driving ratio between the driving shaft 9 and driven shaft 11. The movement of the piston also operates as it turns lever 31 about its pivot 33 to move link 43 to the right and to close valve 49. A further movement of the transmission may be effected by a further movement of lever 65, the valve being self-closing after each movement of the lever.

In Figure 1, lever 39′ corresponds to lever 39 in that its rotation operates the same transmission within housing 7 for controlling the speed reduction. In this case the lever 39′ is controlled only indirectly by a manually operated lever. In this form, provision is made to vary the angularity of the shafts 9 and 11 in accordance with the operation of the engine. We have shown provision for varying the reduction ratio in proportion to the speed of the engine and also in proportion to the degree of suction in the engine manifold.

Lever 39′, which may be called a movable means to control the transmission, is connected by a link 65 to a rod 67 slidably guided in a sleeve 69 in the end wall 71 of a housing 73 positioned adjacent the engine. Within the housing 73 the rod 67 is pivoted to an intermediate point of a movable member or bar 75 positioned normally at a right angle to rod 67. To offer resistance to the movement of bar 75 to the left are springs 77 connected to the member 75 at substantially equal distance from the pivot of the bar 75, whereby the action of the springs is equalized. At their other ends the springs are connected to a rock shaft 79, journalled at 81 in the casing walls. Rotation of the rock shaft to variably (and equally) tension springs 77 is effected by a lever 83 at the dash, a bell crank 85, and connecting links 87 and 89. Within the housing 73 is rotatably mounted a shaft 91. Shaft 91 extends out through a suitable bearing 93 in the front wall of the housing and is jointed to a shaft 95 which is to be driven by the engine in any suitable way. Pivoted to a sleeve 97, rotatably carried by the shaft but held from axial movement thereon, are a plurality of links 99. Rotatably and slidably mounted on shaft 91 is a second sleeve 101 spaced from sleeve 97. Sleeve 101 has pivoted thereto a series of links 103. Links 103 and 99, at their adjacent ends, are pivoted to each other, weights 105 being carried by pivotal connection. This construction is designed to constitute a centrifugal governor. Lever 75 is extended beyond its connection with the upper spring 77, and at its end is connected to the movable sleeve 101, so that when said sleeve moves, as to the left, under the centrifugal action of weights 105, it moves the upper end out of lever 75 with it. At the bottom of case 73 is a cylinder 107 within which is a piston 109. A rod 111 connects piston 109 to the end of lever 75. A tube 113 connects the engine manifold 115 with a cylinder 107, the suction of the manifold tending to move the piston 109 to the left, the piston being subject to atmospheric pressure on the right. This movement will tend to move bar 75 to the left and through its movement operate to change the transmission through the instrumentality of links 65 and lever 39′. It will be evident that increase in engine speed will cause an increase in rate of rotation of shaft 91. The centrifugal governor will therefore be effective to pull bar 75 to the left and operate through link 65 and arm 39′ to change the speed ratio of the transmission. In such movement of bar 75 to the left, under the influence of the governor or of suction of cylinder 107, the bar may be moved against the tension of springs 77, which may be variably controlled through the action of manually operated lever 83. It will be seen, therefore, that if the position of lever 39′ is such as to maintain the transmission in its low speed position a movement of 75 to the left, due to the governor or to increase in suction cylinder 107, or both, will change the transmission ratio toward its normal or direct speed.

It will be understood that manual effort applied to lever 83 is operable to tension springs 77 and to move bar 75 toward the right, this action opposing the action of the automatic mechanism tending to move bar 75 to the left. The lever 83 therefore becomes a manually operable mechanism functioning to oppose a shift toward higher driving ratios. Through its manipulation it becomes possible to keep the speed ratio down at a time when the automatic mechanism might tend to shift the ratio up. The manipulation of the lever 83 therefore makes possible better acceleration.

The normal position of lever 83 will be such that the rate of shifting under the influence of the automatic mechanism will be such as is desired by the operator for ordinary driving conditions. In the event that additional acceleration be desired, it is only necessary to modify the action of the automatic mechanism by manipulating the auxiliary manual control.

In Figure 5, we have shown as a substitute for the suction operated mechanism a mechanical connection between the throttle valve and the bar 75. In this case the arm 115 on pivot axis of the throttle valve is connected by a link 117 to a bell crank 119. The bell crank is pivoted at 120. A rod 121 is pivotally connected to the bell crank at 123. This rod 121 is connected to a rod 125, the latter to be pivotally connected to the bar 75 as shown in Figure 1. For proper guidance of this rod connection, rod 121 may have an enlargement 127, guided in a suitable member 129. In this form of the invention, when the throttle valve is open and the suction condition of the manifold is reduced, the connections produce precisely the same effect as when the piston 109 is at the right hand end of cylinder 107, in Figure 1. Since a closed throttle corresponds with high suction, the operation is substantially the same as in the form shown by Figure 1.

As shown in Figure 1 and Figure 3, the transmission housing 7 is extended somewhat to the rear of the parts already described. The purpose of this extension is to provide for associating with the gearless variable speed transmission an independent transmission, to provide for reverse drive and, if desired, a further low speed ratio. Such second transmission unit is not a part of this invention and since it may be of any known form, it need not be described or illustrated. Such supplementary transmission may be operated by an independent operating means. If desired, it may be operated by a lever on the instrument board. In this event, the lever may be given a plurality of range of movement—one for operating the mechanism herein described and other ranges of movement for operating the supplementary gear shifting mechanism. Such a plurality of ranges may be adopted as is shown in the copending application of Tenney S. N. 338,720 and assigned to the assignee of this application.

Having described the invention, we claim:

1. In combination with an infinitely variable transmission, an operating mechanism therefor comprising an operable member, transmission actuating means to actuate said variable speed transmission, a fluid pressure valve, a connection between said operable member and said valve and said transmission actuating means whereby said operable member operates through said valve to move said transmission mechanism by fluid pressure and whereby said connection thereafter closes said valve, together with a power cylinder having a piston, said cylinder being in communication with said valve, said connection including a floating lever, one end of said lever operably connected to said valve, the other end of said lever operably connected to said transmission operating means and to the piston of the power cylinder.

2. In combination, a variable speed transmission comprising a driving shaft and a driven shaft, driving means therebetween, means to vary the angular relation between said shafts to vary the drive ratio therebetween, a fluid pressure control valve, a power cylinder with a piston therein, the cylinder being in communication with said valve, a lever, one end of said lever operably connected to said valve, the other end of said lever connected to said means for varying the angularity of the transmission shafts and also connected to said piston, an operating member, a mechanical connection therefrom to an intermediate point of said lever.

3. In combination, an engine having an induction conduit, a variable speed transmission comprising a driving shaft and a driven shaft, driving means therebetween, means to vary the angular relation between said shafts to vary the drive ratio therebetween, mechanism movable by changes in engine speed, and an operable connection between said mechanism and the said means to vary the driving ratio.

4. In combination, an engine having an induction conduit, a variable speed transmission comprising a driving shaft and a driven shaft, driving means therebetween, means to vary the angular relation between said shafts to vary the driving ratio therebetween, mechanism movable by changes in the fluid pressure within said induction conduit, and an operable connection between said mechanism and the means to vary the driving ratio.

5. In combination, an engine having an induction conduit, a variable speed transmission, comprising a driving shaft and a driven shaft, driving means therebetween, means to vary the angular relation between said shafts to thereby vary the driving ratio therebetween, mechanism moved by changes in engine speed and the changes in the pressure within said conduit, and an operable connection between said mechanism and the means for varying the driving ratios.

6. In combination, an engine having an induction conduit, a variable speed transmission, movable transmission operating means, to change the speed ratios provided by said transmission, mechanism movable by changes in engine speed and by changes in the pressure within said conduit to move said movable means together with resilient means normally operable to produce a low speed driving ratio within said transmission.

7. In combination, an engine having an induction pipe, a variable speed transmission to be driven by said engine, movable means to vary the speed ratio of said transmission, a centrifugal governor and an engine suction operated device, a movable member, said member being connected to said movable means and to said governor and said suction control device, together with resilient means connected to and operating to resist such movements of said member as operate to increase the speed ratio provided by said transmission, and manually operated means to control the tension of said resilient means.

8. In combination with an internal combustion engine, having a fuel intake conduit, a shaft driven by said engine, a governor on said shaft, a fluid pressure cylinder having a piston, a pipe from said fuel conduit to said cylinder, a lever member terminally connected to said governor and said piston, a variable speed transmission for said engine, movable means to vary the speed ratio thereof, a connection between said lever member and said means.

9. The invention defined by claim 8, together with resilient means connected to and operable upon said member against that motion of the member by the governor and piston which tends to increase the speed provided by the transmission, and manually operable means to control the action of said resilient means.

10. In combination, an internal combustion engine, having a fuel inlet conduit, a variable speed transmission driven by said engine, fluid pressure operated means to vary the speed ratio of said transmission, said fluid pressure operated means including a power cylinder and a self-closing valve, movable means to control said transmission, a connection from said movable means to said valve, said connection including a lever, a connection from said lever to said power cylinder through which said power cylinder operates to close the valve, a movable member, a connection between said movable member and movable means, automatically operable mechanism controlled by the speed of the engine to move said movable member.

11. In combination, an internal combustion engine having a fuel inlet conduit, a variable speed transmission driven by said engine, said transmission having a shifting device, fluid pressure operated means to vary the speed ratio of said transmission, said fluid pressure operated means including a power cylinder having a piston and a valve, said valve being in connection with said cylinder, movable means to control said transmission, a lever pivoted to said movable means, a connection from one arm of the lever to the valve, connections between the other arm of the lever and the piston of the power cylinder and also the said shifting device, a movable member, a connection between the movable member and the movable means and a mechanism responsive to the speed of the engine and the pressure within said fuel inlet to automatically control the action of said transmission through said movable member and movable means.

12. The invention defined by claim 11, together with resilient means, connected to and operable upon said movable member to reduce the speed ratio of said transmission, and manually operable means to control said resilient means.

13. In combination with an internal combustion engine of a vehicle, a variable speed transmission comprising a driving shaft and a driven shaft and driving means therebetween, means to vary the angular relation between said shafts to thereby vary the driving ratio therebetween, mechanism moved by variation in engine speed and connecting means between said mechanism and the ratio varying means to automatically move said ratio varying means.

14. An engine having an infinitely variable speed transmission connected thereto, fluid-pressure mechanism, connections between said fluid pressure mechanism and said variable speed transmission whereby the fluid pressure mechanism operates to control the speed ratio of said transmission, a floating lever, connecting means between said floating lever and said fluid pressure mechanism, a member movable in response to changes in engine speed, and a connection between said member and said lever.

15. In combination, an engine having an induction conduit, a variable speed transmission, movable transmission operating means, to change the speed ratios provided by said transmission, mechanism movable to move said movable means, said mechanism being jointly and independently responsive to engine speed and to pressure changes within said conduit, and manually operable means to move said mechanism.

16. In combination, an engine having an induction conduit, a variable speed transmission, movable transmission operating means to change the speed ratios provided by said transmission, mechanism movable by change in engine speed and by changes in the pressure within said conduit to move said movable means, resilient means normally operable to produce a low speed driving ratio within said transmission, and manually operable means to control the tension of said resilient means.

17. In a power transmission control for automotive vehicles, in combination, an internal combustion engine and a throttle control member therefor, a variable speed ratio transmission, an automatic control mechanism for varying the speed ratio of said variable speed ratio transmission consisting of speed ratio selecting means, speed responsive means for influencing the motion of said means, other means responsive to the position of said throttle control member for influencing the motion of said speed ratio selecting means, said other means being operable both jointly with and independently of said speed responsive means, and additional means manually operable to influence the motion of said speed ratio selecting means.

18. In power transmission control mechanism, an engine and a throttle therefor, a variable speed transmission, a speed ratio selecting device therefor, means responsive to said throttle position operable through a fluid column for influencing said speed ratio selecting device, a speed responsive device for influencing said speed ratio selecting device, said throttle responsive means and said speed responsive device being jointly and independently operable, and auxiliary manual modifying means for moving said speed ratio selecting device.

19. In power transmission control mechanism, an engine, a variable speed transmission, a speed ratio changing device including auxiliary power operating means, fluid operated means for influencing selection of speed ratio, speed responsive means for influencing selection of ratio, said fluid operated means and said speed responsive means being operable jointly and independently, movable means connecting said speed ratio changing device with both of said last named means, and additional manually operable means for moving said last named means.

20. An engine, a manually operable speed controlling element for the engine, a variable speed transmission, a movable speed ratio selecting element therefor, a speed responsive element, means interconnecting said elements whereby the driving speed ratio is determined jointly by the will of the operator acting through the manually operable speed controlling element and by the operating conditions of the engine operable upon said governor, auxiliary power means for actuating ratio change operably connected to the speed ratio selecting element, and auxiliary manually operable mechanism for moving said first named means.

21. In combination, a power transmission device including a throttle controlled engine, a speed ratio control mechanism operatively connected with said engine comprising, means constantly responsive to said throttle position and said engine speed, said means comprising jointly and independently operable mechanisms, and additional means manually operable to move said means.

22. In combination with an automatic speed ratio changing mechanism for motor vehicles, a movable control element including means responsive to variations in speed of the motor, means responsive to variations in motor torque, and means operative to vary the effect of both said means on said movable control element for predetermined changes in speed and load.

23. In combination with an automatic speed ratio shifting mechanism for motor vehicles, a movable control element operative to actuate said mechanism, and means for displacing said control element including means responsive to variations in motor torque, means responsive to variations in speed of the motor, and means operated to simultaneously vary the effects transmitted by said last two named means to said movable control element for predetermined changes in load and in speed.

24. In combination, a motor, a driving shaft, a driven shaft, ratio changing transmission mechanism between said shafts, a lever controlling said transmission mechanism, means to actuate said lever, speed responsive means operable upon said lever-actuating means and means responsive to motor torque also operable upon said lever-actuating means together with manually displaceable means to adjust said lever-actuating means independently of said speed-responsive and motor torque responsive means.

25. An engine having a suction region, a driving shaft, a driven shaft, ratio-changing transmission between said shafts, means responsive to the speed of the driving shaft and operable upon said ratio-changing mechanism, and means responsive to the degree of suction within said suction region also operable upon said ratio-changing mechanism.

26. In a power transmission mechanism, in combination, an engine having an intake suction duct, a driving shaft, a driven shaft, a variable speed transmission therebetween whereby their relative speeds may be controlled, a movable control member for said transmission, a device continuously responsive to the degree of suction in said intake duct and connected to said control member whereby the motion of the latter is proportional to the degree of suction, and separate means acting on said member for modifying the effect of said device upon said control member.

27. An engine having an intake suction duct, a driving shaft, a driven shaft, coupling mechanism therebetween whereby the driven shaft may be operated from the driving shaft at variable speed ratios, a control for said coupling mechanism, a device continuously responsive to the degree of suction in said engine intake duct and operably connected to the control for said coupling mechanism whereby the speed ratios between said driving and driven shafts may be varied, and auxiliary control means operably connected to said control for said coupling mechanism to modify the effect of the device responsive to degree of vacuum.

28. In power transmission control mechanism, in combination, an engine having a suction chamber, a variable speed transmission, a speed ratio changing element, means responsive to variations in suction in said suction chamber for influencing selection of transmission speed ratio, speed responsive means for influencing selection of speed ratio, movable means connecting said speed ratio changing element with both of said last named means, and additional means operable upon the movable means for influencing selection of ratio.

29. In a power transmission device, an engine, a driving shaft, a driven shaft, ratio changing mechanism therebetween, a transmission speed ratio controlling element, a speed responsive element, an element responsive to motor torque, and means interconnecting these elements whereby the driving ratio is determined jointly thereby, said means including a floating lever.

30. In a power transmission device including a prime mover, a speed-controlling element for the prime mover, a transmission speed ratio selecting element, a speed responsive element, and means interconnecting these elements whereby the driving ratio is determined jointly by the will of the operator acting through the speed-controlling element and by the operating conditions of the power transmission operable through the speed-responsive element, said means including a floating lever, the connections of the speed-controlling element and the speed-responsive element with the lever constituting fulcra each for the other.

31. In a power transmission mechanism, an engine, a throttle for the engine, a variable speed transmission, speed ratio controlling means for the transmission, a speed-responsive governor mechanism, a differential motion mechanism, and means connecting said differential motion mechanism with said throttle, said speed ratio controlling means and said governor mechanism.

32. In a power transmission control mechanism, in combination, an engine, a throttle, a variable speed power transmission, a speed ratio changer for the transmission, an auxiliary fluid pressure device for actuating the change of ratio in the transmission, a governor, movable means connected to said speed ratio changer, throttle, and governor, and separate control means for influencing the motion of said last-named means.

33. In combination, a motor including a driving shaft, a driven shaft adapted to be coupled in various speed ratios to said driving shaft, and means continuously operative by changes in the suction exerted by the motor and by the speed of one of said shafts to change the relative speeds of said driving and driven shafts.

34. In combination, a motor including a driving shaft, a driven shaft adapted to be coupled in various speed ratios to said driving shaft, means continuously operative by variations in the suction of the motor to change the relative speeds of the driving and driven shafts, and means operative to modify the action of said first-named means.

35. In combination, a motor including a driving shaft, a driven shaft, ratio-changing coupling mechanism between said driving and driven shafts, a lever controlling said mechanism, means operative by changes in motor torque and by variations in speed of one of said shafts to actuate said lever, and additional means operable to modify said means.

36. In combination, an engine, a driving shaft, a driven shaft, a speed ratio changing transmission between said shafts, a speed ratio control element therefor, differential motion mechanism operative to move said speed ratio control element, means responsive to the speed of one of said shafts to vary the movement of said differential motion mechanism, and additional manual means operative to vary the degree of movement imposed by said speed-responsive means.

37. An engine, an operator-controlled engine throttle, a driving shaft, a driven shaft, a variable speed ratio coupling between the shafts, including a speed ratio actuating member, auxiliary power means continuously operative to move said member, a speed ratio selector continuously operative to control said auxiliary power means, and a device continuously movable by changes in the speed of one of the shafts and by variations in the motion of said operator-controlled engine throttle to position said speed ratio selector.

38. In an automatic speed control system for motor vehicles, in combination, a transmission speed ratio control element, speed responsive means continuously operative to influence the motion of said speed ratio control element, means responsive to motor torque continuously operative to influence the motion of said speed ratio control element, and manual means to modify the rate of change of speed ratio for predetermined conditions of load and speed.

39. In automatic controls for motor vehicles, in combination, an engine, a driving shaft, a driven shaft, a variable speed transmission between the shafts, an automatic control device therefor, including a governor responsive to the speed of one of the shafts, operator-controlled means connected to said device and constantly operative to influence selection of speed ratio, said means coincidentally controlling said engine speed, and additional operator-controlled means operative to vary the rate of change of transmission speed ratio for predetermined operating conditions.

40. In automatic velocity control systems for motor vehicles, in combination, a transmission speed ratio control element, speed-responsive means continuously operative to influence the motion of said element, torque-responsive means jointly and continuously operative to influence the motion of said element, operator-operative means jointly and continuously effective to influence the motion of said element, and additional manual means to modify the rate of change of speed ratio for predetermined conditions of load and speed.

41. In automatic velocity control systems for motor vehicles, in combination, a transmission speed ratio control element continuously effective to change transmission speed ratio, speed-responsive means continuously operative to influence the motion of said element, torque-responsive means jointly and continuously operative to influence the motion of said element, operator-operative means jointly and continuously effective to influence the motion of said element, and additional manual means to modify the rate of change of speed ratio for predetermined conditions of load and speed.

42. In automatic velocity control systems for motor vehicles, in combination, a transmission speed ratio control element, speed-responsive means continuously operative to influence the motion of said element, torque-responsive means jointly and continuously operative to influence the motion of said element, operator-operative means jointly and continuously effective to influence the motion of said element, additional manual means to modify the rate of change of speed ratio for predetermined conditions of load and speed, and fluid pressure ratio actuating means connected to said transmission speed ratio control element.

43. In automatic velocity control systems for motor vehicles, in combination, a transmission speed ratio control element continuously effective to change transmission speed ratio, speed-responsive means continuously operative to influence the motion of said element, torque-responsive means jointly and continuously operative to influence the motion of said element, operator-operative means jointly and continuously effective to influence the motion of said element, additional manual means to modify the rate of change of speed ratio for predetermined conditions of load and speed, and fluid pressure ratio actuating means connected to said transmission speed ratio control element.

44. In automatic velocity control systems for motor vehicles, a continuously operative transmission speed ratio control element, fluid pressure actuated speed ratio changing mechanism connected to said element, speed-responsive means operative to influence the motion of said element, torque-responsive means operative to influence the motion of said element, operator-operative means effective to influence the torque responsive means, and additional manual means to modify the rate of change of speed ratio for predetermined driving conditions of load and speed.

PERRY L. TENNEY.
HARRY E. FIDLER.